(12) United States Patent
Wendzina et al.

(10) Patent No.: US 7,001,119 B2
(45) Date of Patent: *Feb. 21, 2006

(54) ARBOR APPARATUS FOR ROTARY TOOLS

(75) Inventors: Darren L. Wendzina, Calgary (CA);
Michael L. Scheuerman, Calgary (CA)

(73) Assignee: Wenman Ventures Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/970,417

(22) Filed: Oct. 22, 2004

(65) Prior Publication Data

US 2005/0201838 A1    Sep. 15, 2005

Related U.S. Application Data

(60) Provisional application No. 60/523,087, filed on Nov. 19, 2003, provisional application No. 60/513,212, filed on Oct. 23, 2003.

(51) Int. Cl.
*B23B 51/04* (2006.01)
(52) U.S. Cl. .................................. 408/204; 408/239 R
(58) Field of Classification Search ................ 408/204, 408/206, 207, 209, 239 R, 703
See application file for complete search history.

(56) References Cited

U.S. PATENT DOCUMENTS

| | | | | |
|---|---|---|---|---|
| 1,645,736 A | * | 10/1927 | Blanch et al. | ............... 408/206 |
| 3,647,310 A | * | 3/1972 | Morse | ..................... 408/239 R |
| 3,758,221 A | * | 9/1973 | Meshulam | ................... 408/204 |
| 3,880,546 A | | 4/1975 | Segal | |
| 4,422,811 A | * | 12/1983 | Ellison et al. | ............... 408/204 |
| 5,035,548 A | * | 7/1991 | Pidgeon | ........................ 408/68 |
| 5,082,403 A | * | 1/1992 | Sutton et al. | .................. 408/68 |
| 5,096,341 A | * | 3/1992 | Despres | ........................ 408/68 |

(Continued)

FOREIGN PATENT DOCUMENTS

CA        1010751        5/1977

(Continued)

OTHER PUBLICATIONS www.centremagazine.com/issues/ISarticle.asp.?id=1417308&story_id=19033815110, Oct. 24, 2003.

*Primary Examiner*—Boyer D. Ashley
*Assistant Examiner*—Ali Abdelwahed
(74) *Attorney, Agent, or Firm*—Donald V. Tomkins (57) ABSTRACT

An arbor apparatus for mounting an attachment to a rotary tool includes a mandrel with a drive stage insertable into a passage in a drive boss such that rotation of the mandrel rotates the boss. The boss has a polygonal drive head engageable with the drive opening of the attachment. One end of the mandrel has a locking plate that approaches the drive head when the mandrel is inserted into the boss. The locking plate is sized to pass through the drive opening while also partially extending radially beyond the edge of the drive head. With the mandrel inserted through the boss, the locking plate is passed through the drive opening of the attachment. With a gap being maintained between the locking plate and the drive head, the mandrel is manually rotated to allow the drive head to enter the drive opening, simultaneously causing portions of the locking plate to extend beyond the edges of the drive opening. A locking nut is then tightened onto a threaded shaft axially adjoining the drive stage, thereby clamping the attachment between the locking plate and the drive boss. A chuck stage axially adjoining the threaded shaft can then be used to mount the apparatus to a rotary tool in well known fashion.

15 Claims, 9 Drawing Sheets

U.S. PATENT DOCUMENTS

| | | | |
|---|---|---|---|
| 5,435,672 A * | 7/1995 | Hall et al. | 408/68 |
| 5,690,452 A * | 11/1997 | Baublits | 408/204 |
| 5,868,532 A * | 2/1999 | Spenser | 408/204 |
| 5,967,709 A * | 10/1999 | Thuesen | 408/204 |
| 6,341,925 B1 * | 1/2002 | Despres | 408/204 |
| 6,357,973 B1 * | 3/2002 | Chao | 408/204 |
| 6,409,436 B1 * | 6/2002 | Despres | 408/68 |
| 2002/0028117 A1 | 3/2002 | Nuss | |
| 2002/0122703 A1 * | 9/2002 | Czyzewski et al. | 408/1 R |
| 2004/0191015 A1 * | 9/2004 | Kozak | 408/67 |
| 2005/0135886 A1 * | 6/2005 | Scheuerman | 408/204 |

FOREIGN PATENT DOCUMENTS

| | | |
|---|---|---|
| CA | 1049901 | 3/1979 |
| CA | 1059346 | 7/1979 |
| CA | 1077807 | 5/1980 |
| CA | 2457241 A1 | 2/2004 |

* cited by examiner

ARBOR APPARATUS FOR ROTARY TOOLS

Pursuant to 35 U.S.C. 119(e), this non-provisional application claims the benefit of U.S. Provisional Application No. 60/513,212, filed on Oct. 23, 2003, and U.S. Provisional Application No. 60/523,087, filed on Nov. 19, 2003, both of which provisional applications are incorporated herein by reference in their entirety.

FIELD OF THE INVENTION

The present invention relates to arbor apparatus for connecting attachments to rotary drive tools such as power drills.

BACKGROUND OF THE INVENTION

It is known to attach various attachments to rotary drive tools. One such attachment is a circular cup-shaped saw blade attached to a power drill or the like for cutting holes in a variety of materials. An arbor arrangement is used to affix the saw blade to a pilot bit, positioned in the center of the cup saw blade, and to permit the blade and pilot bit to be locked into the chuck of the power drill.

Prior art arbor arrangements comprise a body through which the pilot bit extends. The pilot bit extends through a hole in the center of the cup saw blade. A threaded end of the bit is secured to the body using a nut. Typically, at least one pair of pins extend from the top of the body for engaging corresponding holes in the base of the cup saw blade to transfer torque to drive the saw blade. Should the blade jam up during cutting, the pins are particularly susceptible to breakage.

Further, in most cases, the hole in the base of the saw blade is threaded for engagement with a threaded portion on the top of the arbor body. The relatively small number of threads are easily stripped, particularly if uneven force is applied to the drill during cutting. Further, uneven force by the user and wobble, as a result of worn threads, may cause the pins to wear the corresponding holes resulting in greater instability and wear.

Others have attempted to improve the transfer of torque to the cup saw blade by replacing the pins with a square opening which corresponds to a square body fixed adjacent the chuck end of the pilot bit. A washer is fixed above the square portion of the pilot bit to sandwich the blade between the pilot bit and a nut. The chuck end of the pilot bit is then inserted into the chuck of the drill. While improving transfer of torque to the cup saw blade, this prior art arrangement requires a wrench to lock the blade and does not provide any additional locking aspects to ensure that the nut does not back off which can result in loosening of the saw blade relative to the pilot bit.

For the foregoing reasons, there is a need for an improved arbor apparatus for mounting attachments to rotary drive tools. The present invention is directed to this need.

BRIEF SUMMARY OF THE INVENTION

In general terms, the present invention is an arbor apparatus made up of a multi-stage mandrel that includes a polygonally prismatic drive stage that is coaxially and slidingly receivable within a central passage through a drive boss. The drive boss has a polygonal drive head which is coaxially engageable with a correspondingly polygonal drive opening of a rotary tool attachment such as a cup saw blade. At one end, the mandrel has a locking plate that can pass through the drive opening of the attachment, and the mandrel is insertable into the central axial passage of the drive boss such that the locking plate is near or adjacent to the drive head of the drive boss. The central passage is geometrically oriented relative to the drive head such that at least a portion of the locking plate will lie radially outward of the perimeter of the drive head when the mandrel is inserted into the central passage. The mandrel has a coaxial threaded shaft stage adjoining the drive stage, and an elongate chuck stage coaxially adjoining the threaded shaft.

The mandrel/drive boss assembly is mounted to an accessory by first passing the locking plate through the drive opening in the attachment. Then, while maintaining a space between the locking plate and the drive head, the assembly is rotated 45 degrees (or some other angle, depending on the particular geometry of the components) in one direction or the other, such that the drive head can be inserted into the drive opening in mating engagement, whereupon at least a portion of the locking plate will lie radially outward of the edges of the drive opening. A locking nut is then rotated onto the threaded shaft so as to urge the drive boss toward the locking plate, thus clamping the attachment between the drive boss and the radially extending portion of the locking plate, with the drive head of the drive boss engaged within the drive opening of the attachment. The assembly is then connected to a rotary tool such as a power drill by engaging the chuck stage of the mandrel in the chuck of the rotary tool. When the tool is actuated, thus rotating the mandrel, the drive stage rotates the drive boss and drive head, thus rotating the attachment in turn.

The attachment can be easily and quickly removed from the arbor apparatus by loosening the locking nut to unclamp the attachment, axially rotating the mandrel/drive boss assembly to allow the locking plate to pass through the drive opening of the attachment.

Accordingly, in one aspect the present invention is and arbor apparatus for mounting an attachment for a rotary drive tool, said attachment having a drive opening, and said arbor apparatus comprising:

(a) a mandrel comprising, in coaxial arrangement:
  a.1 a chuck stage, adapted for removable engagement with the chuck of a rotary drive tool;
  a.2 a threaded shaft stage adjoining the chuck stage, with the radius of the shaft at the thread root being not less than the largest radial cross-sectional dimension of the chuck stage;
  a.3 a drive stage adjoining the threaded shaft and having a non-circular cross-section, with the smallest radial cross-sectional dimension of said drive stage being not less than the outer radius of threaded shaft; and
  a.4 a non-circular locking plate adjoining the drive stage, and having an upper surface and a substantially planar lower surface, said lower surface being oriented toward the drive stage and being substantially perpendicular to the longitudinal axis of the mandrel;
(b) a drive boss comprising:
  b.1 a main body section having an upper end and a lower end;
  b.2 a prismatic drive head projecting above the upper end of the main body section and having an upper surface, said drive head being of a cross-sectional shape adapted for mating engagement with the drive opening of the rotary attachment; wherein:
  b.3 the drive boss has a central passage extending therethrough from the upper surface of the drive head to the lower surface of the main body section;

b.4 the central passage is geometrically configured to receive the drive stage of the mandrel in mating engagement therewith, such that rotation of the mandrel will induce rotation of the drive boss;

b.5 the orientation of the central passage relative to the drive head is such that upon insertion of the drive stage into the passage, a portion of the locking plate will project over the upper surface of the drive head; and b.6 the upper end of the main body section of the drive boss defines a shoulder surface extending radially beyond the perimeter of the drive head, said shoulder surface being substantially planar and being substantially perpendicular to the longitudinal axis of the drive boss; and (c) a locking nut having a threaded bore engageable with the threaded shaft.

The drive stage of the mandrel is preferably of polygonal cross section, such as hexagonal or square.

The locking plate is preferably polygonal in shape, and in particularly preferred embodiments is square.

Also in preferred embodiments, the mandrel incorporates means for coaxially and removably mounting of a pilot bit extending from the upper surface of the locking plate. The mandrel may include an axial bore extending from the outer surface of the locking plate into the drive stage, and a pilot bit may then be inserted into the axial bore. The pilot bit may be retained in the axial bore by means of a set screw engageable with a threaded bore extending radially inward from the side surface of the drive stage and intercepting the axial bore.

In an alternative embodiment, the locking plate and drive stage are square, with the drive stage being angularly offset approximately 45 degrees from the locking plate, and sized such that each of its four corner edges coincides substantially with the midpoint of a corresponding side edge of the locking plate.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
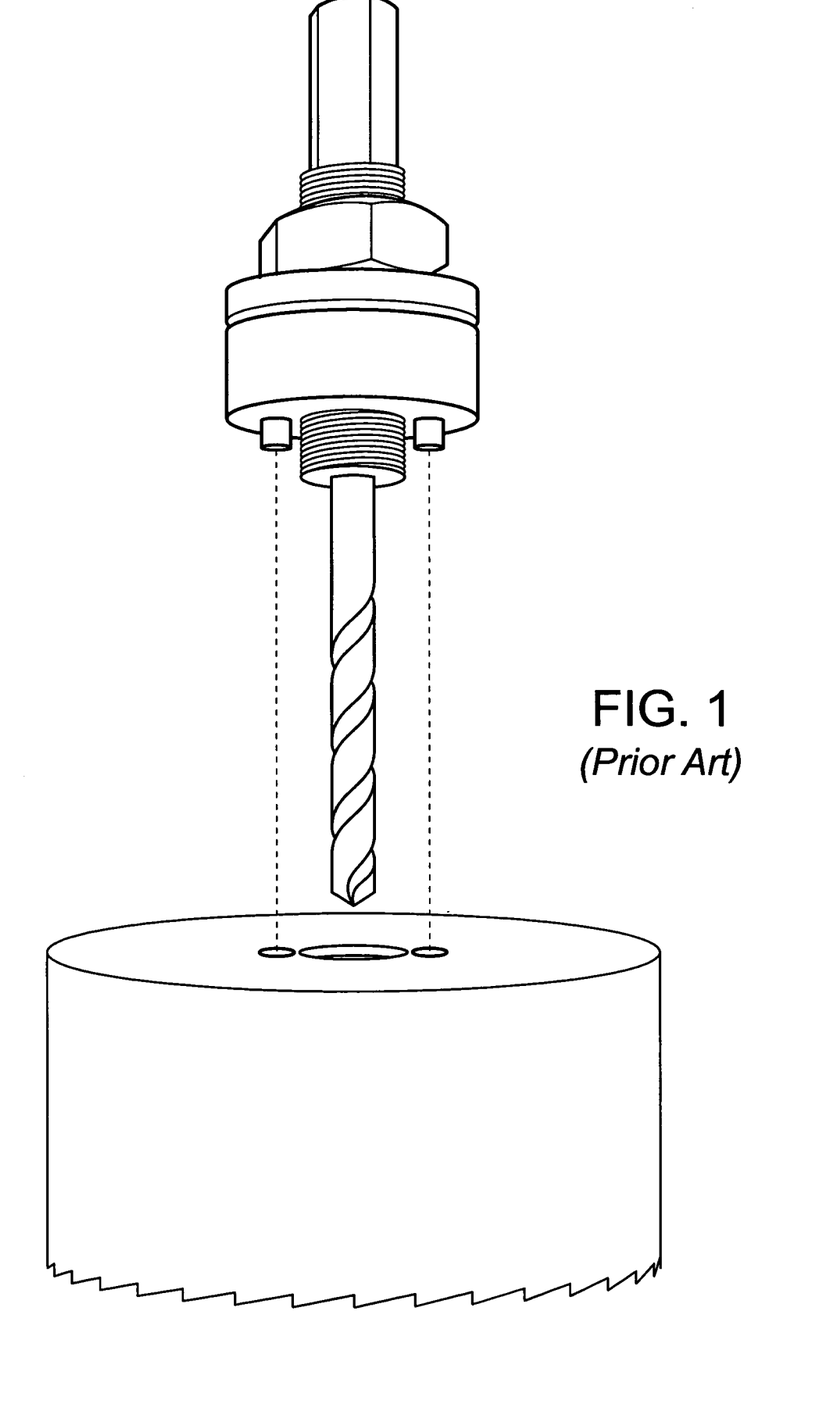
FIG. 1 is an exploded perspective view of a prior art arbor arrangement and a cup saw blade, the arbor having pins for transferring torque.
Figure 2A:
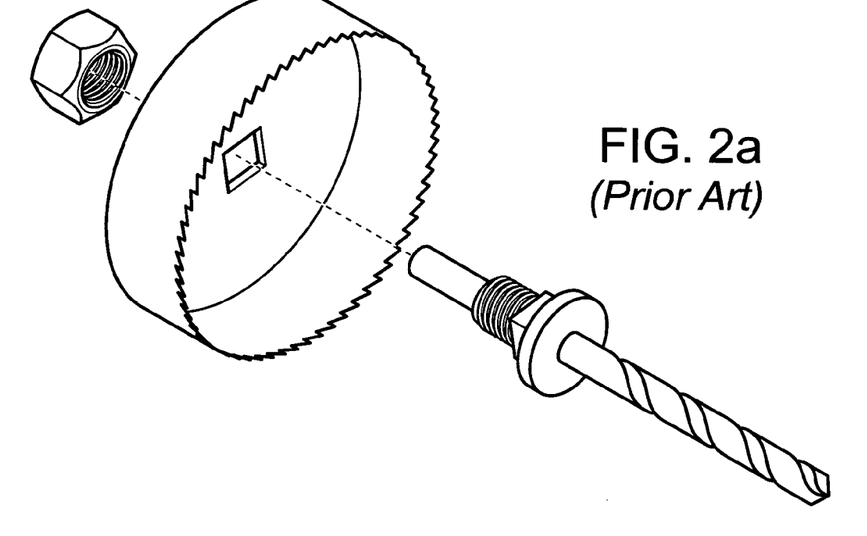
FIG. 2a is an exploded view of an alternative prior art arbor arrangement having a square drive for transferring torque to a cup saw blade.
Figure 2B:
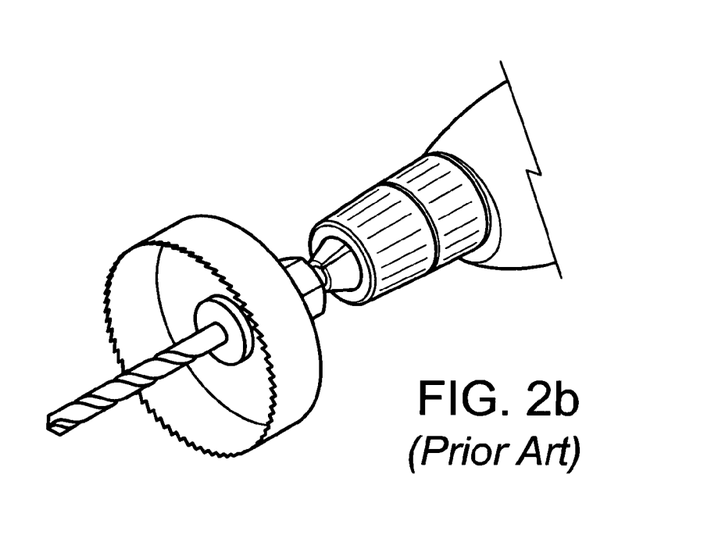
FIG. 2b is a perspective view of the prior art arbor arrangement according to FIG. 2a, mounted to a rotary drill.

As shown in FIGS. 1 and 2, prior art arbor arrangements comprise pins or square drives for transferring torque to a cup saw blade attached to a rotary tool such as a power drill.

Figure 3:
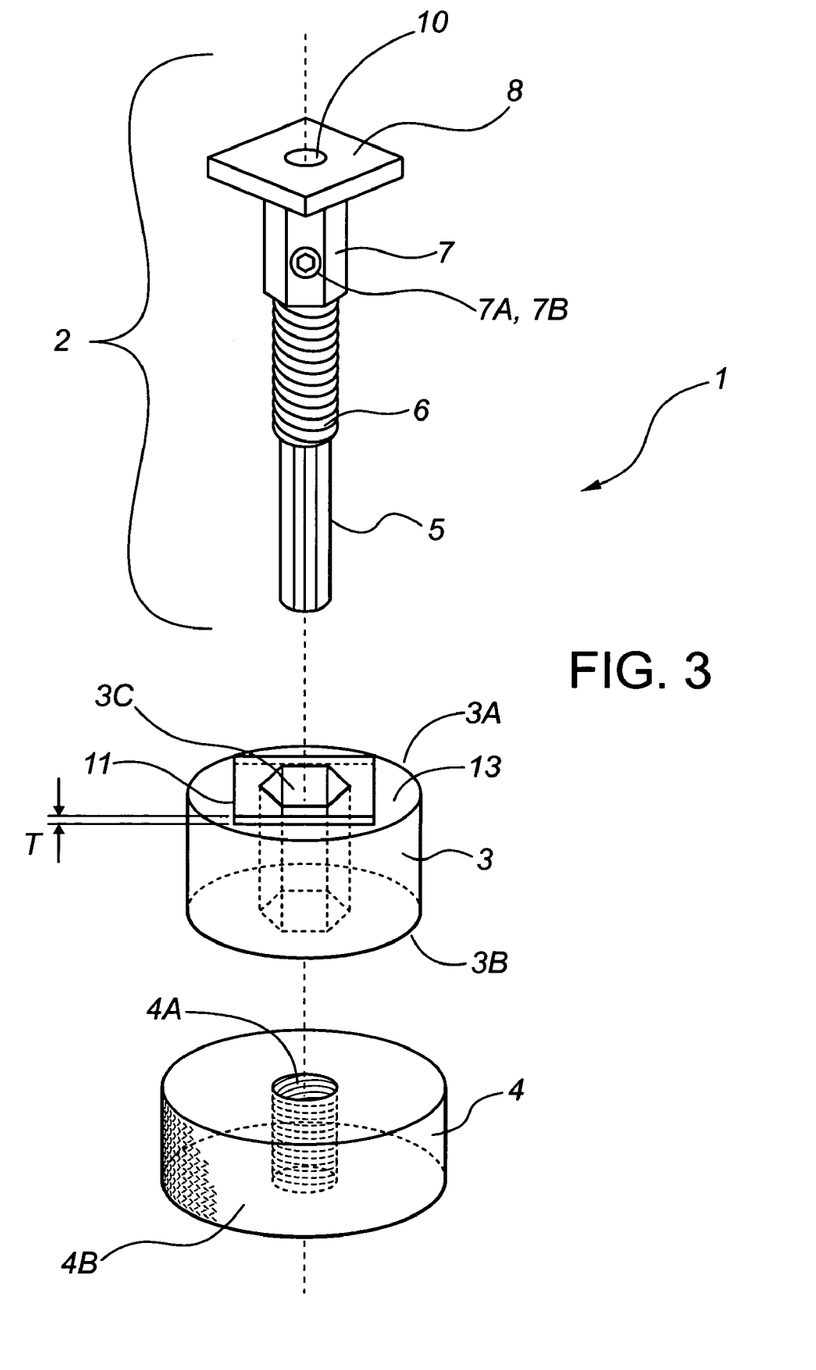
FIG. 3 is an exploded isometric view illustrating an arbor apparatus in accordance with the present invention, wherein the drive stage of the apparatus is hexagonal in cross section, and wherein the drive head and locking plate of the apparatus are square.

FIG. 3 illustrates an arbor apparatus in accordance with one embodiment of the present invention. The arbor apparatus, generally indicated by reference numeral 1, comprises a mandrel 2, a drive boss 3 and a locking nut 4.

The mandrel 2 comprises, in coaxial arrangement, a chuck stage 5, a threaded shaft 6, a drive stage 7, and a locking plate 8.

The chuck stage 5 is adapted for mounting in the chuck of a power drill, and preferably is hexagonal in cross section to promote positive engagement in the chuck.

The cross-sectional diameter of the threaded shaft 6, as measured at the root of the threads, exceeds the largest cross-sectional dimension of the chuck stage 5, such that the cross-sectional perimeter of chuck stage 5 lies within the cross-sectional perimeter of the root of the threaded shaft 6. This dimensional configuration enables the locking nut 4 to pass over the chuck stage 5 without interference.

The drive stage 7 is of uniform polygonal cross section, such as hexagonal as shown in FIG. 3. In the alternative embodiment illustrated in FIGS. 6 and 8, the drive stage 7 is of square cross section. The drive stage 7 is sized such that the cross-sectional perimeter of the threaded shaft 6, as measured at the radial extremity of the threads, lies within the cross-sectional perimeter of the area of the drive stage 7. This dimensional configuration enables the drive stage 7 to pass over the threaded shaft 6 without interference.

The locking plate 8 is of any non-circular shape and of such dimensions that it will readily pass through the drive opening 12 of the attachment to be mounted to the rotary tool, as described in greater detail hereinbelow. In the preferred embodiment, the locking plate 8 is square, to match a square drive opening 12. However, the locking plate 8 could be of another polygonal shape, or even an oblong curvilinear shape, provided that it will still pass through the drive opening 12 of the particular attachment, and provided that at least part of it will extend beyond the edge of drive opening 12 when the locking plate 8 is inserted through the drive opening 12 and then partially axially rotated. This important characteristic can be readily appreciated with reference to FIGS. 5a–5d and related descriptive text presented further on in this specification.

The mandrel 2 is preferably of unitary construction, and machined of otherwise fabricated from a single piece of stock material. However, the mandrel 2 may be assembled from separate components, provided that the complete mandrel assembly is coaxially rotatable as a unit.

Figure 4A:
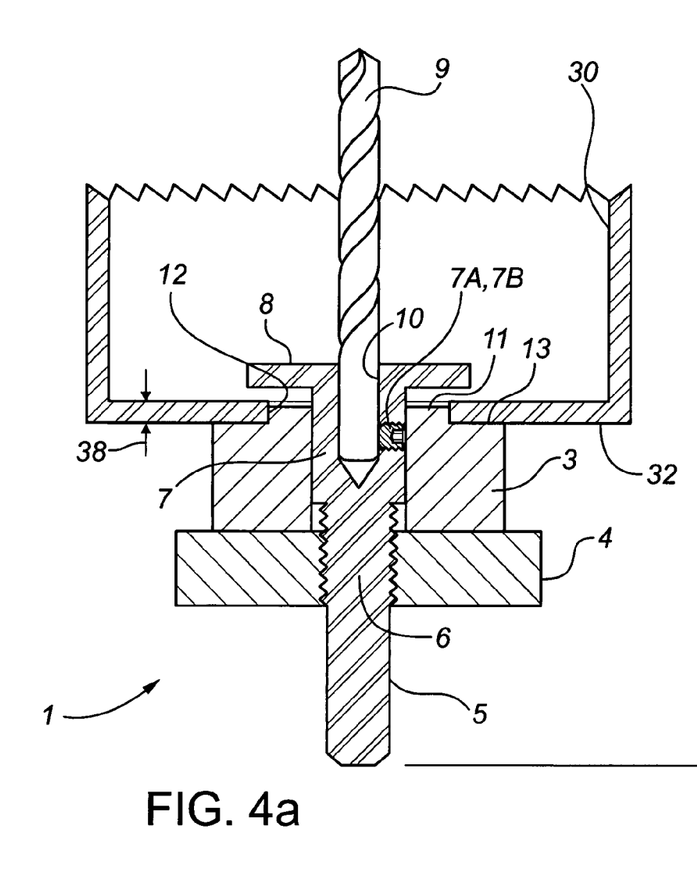
FIG. 4a is a sectional view of the arbor apparatus shown in FIG. 3, with the locking nut of the apparatus in a loosened position.
Figure 4B:
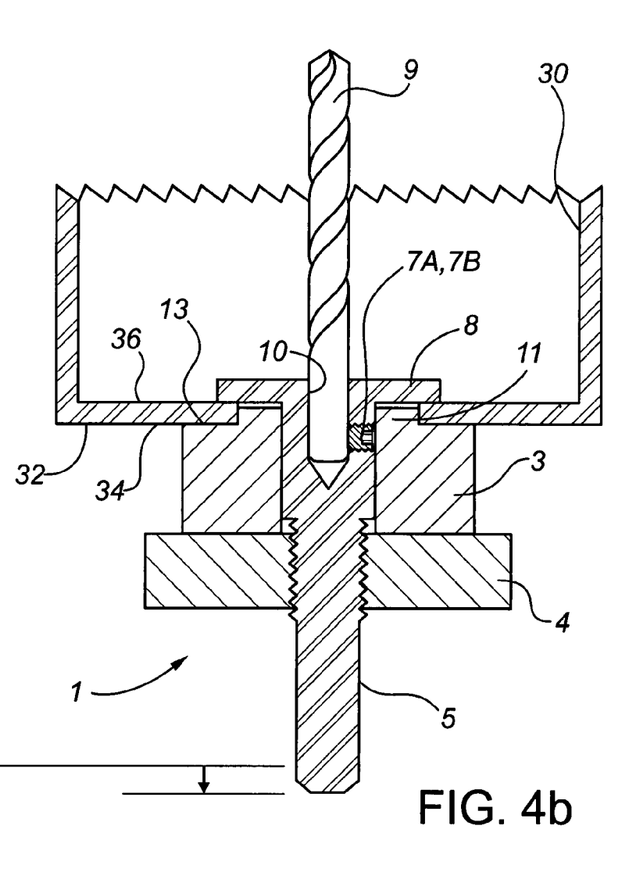
FIG. 4b is a sectional view of the arbor apparatus of FIG. 3, with the locking nut in a tightened position.

The mandrel 2 incorporates means for coaxially mounting a pilot bit 9 projecting outward from the locking plate 8. As shown in FIGS. 3, 4a, and 4b, this is achieved in the preferred embodiment by providing a cylindrical bore 10 extending coaxially into the mandrel 2 through the locking plate 8 and into the drive stage 7. The pilot bit is secured in the bore 10 by pilot bit securing means, preferably in the form of a set screw 7A which can be inserted into threaded radial bore 7B in drive stage 7, so as engage the inserted end of the pilot bit 9 and removably secure it within cylindrical bore 10. Other equally effective means for mounting the pilot bit 9 will be readily apparent to persons of ordinary skill in the art of the invention.

The drive boss 3 comprises a main body section having an upper end 3A and a lower end 3B. Projecting above upper end 3A is a prismatic drive head 11 adapted to engage the drive opening 12 of a rotary tool attachment such as a cup saw blade 30. As best seen in FIG. 3, the drive boss 3 has a central passage 3C of uniform cross-sectional shape and dimensions such that the drive stage 7 of mandrel 2 may be inserted into the central passage 3C in sufficiently mating engagement so that rotation of the mandrel 2 will induce corresponding and coaxial rotation of the drive boss 3. Accordingly, the central passage 3C will be hexagonal in the embodiment shown in FIG. 3, where the drive stage 7 is hexagonal. As will be seen, alternative embodiments may feature a square drive stage and a corresponding square central passage 3C, and other configurations are possible.

The drive head 11 may be square in shape, as illustrated in the Figures, but alternatively could be of a different polygonal or other geometric shape to suit different shapes of opening 12. At least a portion of the main body section of drive boss 3 extends radially beyond the edges of the drive head 11 to form a shoulder 13 in a plane substantially perpendicular to the axis of the mandrel 2 and the drive boss 3. The shoulder surface 13 is adapted for engagement with the outer surface 34 of blade 30 (or other attachment), as may be seen in FIGS. 4a and 4b, and as will be explained in greater detail later in this specification.

The angular orientation of drive head 11 relative to the central passage 3C is such that upon insertion of drive stage 7 of the mandrel 2 into the central passage 3C, the locking plate 8 will be angularly offset from the drive head 11. As will be seen, this angular offset allows for the locking plate 8 to pass though drive opening 12 of the blade 30 (or other attachment) and then project beyond and partially overlap the mounting plate 32 of blade 30 when the assembled apparatus is partially rotated.

The locking nut 4 has a threaded bore 4A. In preferred embodiments, the locking nut 4 has a circular perimeter as shown in FIG. 3, with at least a portion of the perimeter surface 4B of the locking nut 4 being textured (such as by knurling) to facilitate manual tightening. However, the locking nut 4 may alternatively be of elliptical, polygonal, or other shape, and may be adapted for tightening with a wrench or other tool.

Figures 5A, 5B, 5C, 5D:
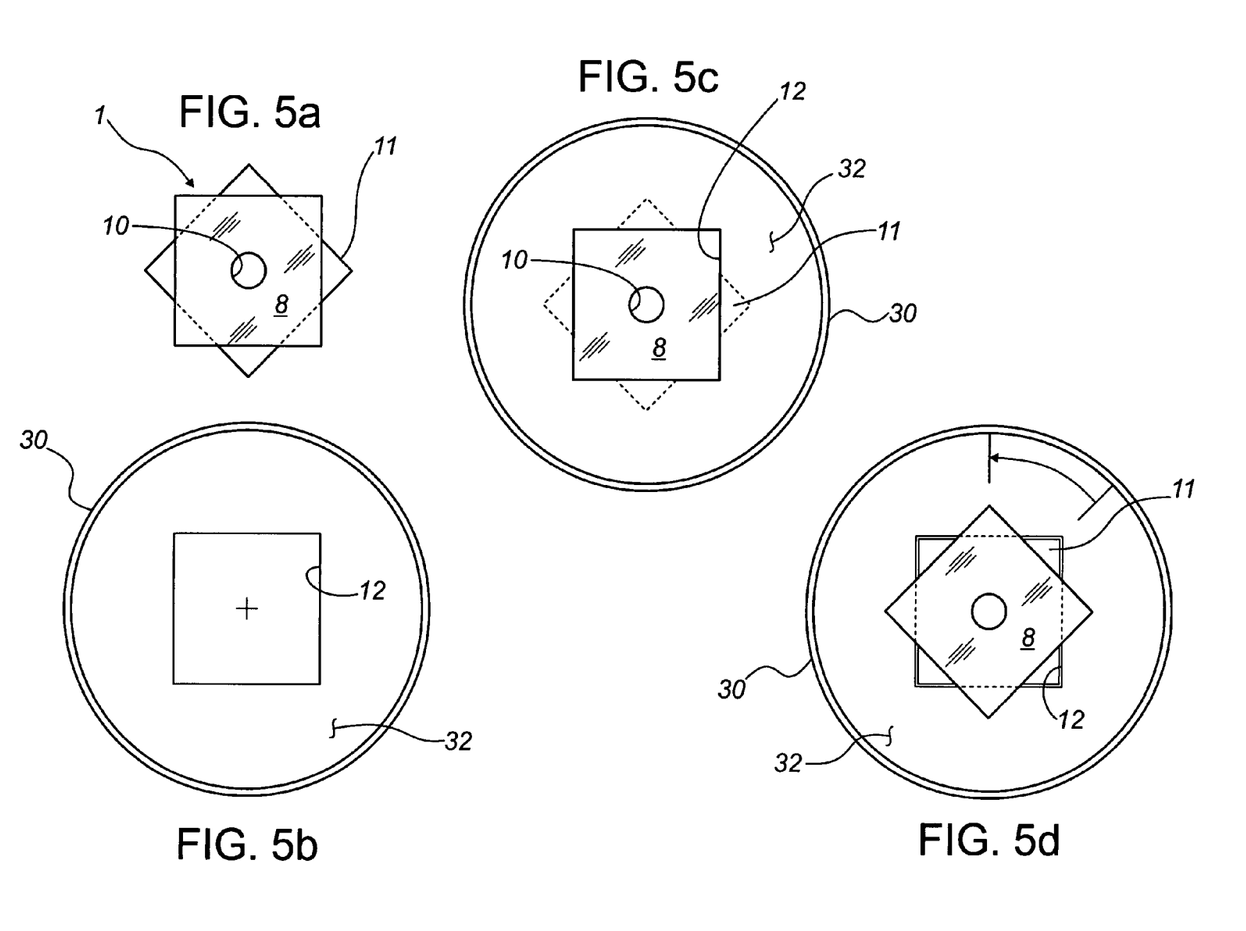
FIG. 5a is an end view of the mandrel and drive boss of the present invention, assembled and configured for mounting to a rotary tool, and illustrating the angular offset of the locking plate relative to the drive head of the drive boss (outline of drive boss omitted for clarity of illustration).
FIG. 5b is an end view of a cup saw blade having a square drive opening for receiving the square drive head of the embodiment of the present invention as shown in FIG. 3.
FIG. 5c is an end view of the cup saw blade as in FIG. 5b positioned over the mandrel/drive boss assembly, with the locking plate disposed within the drive opening in the blade, and with the drive head disposed beneath the mounting plate of the blade.
FIG. 5d is an end view of the cup saw blade and mandrel/drive boss assembly according to FIG. 5c, showing the mandrel/drive boss assembly after having been partially rotated to allow the drive head to be positioned in the drive opening, with portions of the locking plate projecting over the mounting plate of the blade.

The preferred method of use and operation of the present invention may be readily understood having reference to FIGS. 4a–4b and FIGS. 5a–5d. The drive boss 3 is inserted over the mandrel 2 with the drive head 11 and shoulder 13 disposed toward the locking plate 8 of the mandrel 2, and with the locking plate 8 angularly offset relative to the drive head 11, as illustrated in FIG. 5a (for the case of a square locking plate 8 and a square drive head 11). The drive boss 3 is initially retained loosely on the mandrel 2 by screwing the locking nut 4 onto the threaded shaft 6 of the mandrel 2 so as to leave a space between the drive head 11 and the locking plate 8 at least slightly greater than thickness 38 of mounting plate 32 of cup saw blade 30.

The locking plate 8 is then inserted through the square drive opening 12 in the mounting plate 32 of blade 30 as shown in FIG. 5c, with the locking plate 8 slightly above the inner surface 36 of the mounting plate 32 as shown in FIG. 4a. The mandrel/drive boss assembly is then axially rotated approximately 45 degrees relative to the blade 30 so as to allow the drive head 11 to be inserted into the drive opening 12 of blade 30. The locking nut 4 is then tightened onto the threaded shaft 6, thereby clamping the mounting plate 32 of blade 30 between the shoulder 13 and the locking plate 8 as shown in FIG. 4b.

The blade 30 is thus securely retained by the arbor apparatus 1 of the invention, such that when the apparatus 1 is axially rotated (e.g., by a rotary drill), the drive stage 7 of the mandrel 2 transfers rotational energy to the drive boss 3 by virtue of the mating engagement of the drive stage 7 of the mandrel 2 within the central passage 3C of drive boss 3, and drive boss 3 in turn transfers rotational energy to the blade 30 by virtue of the mating engagement of the drive head 11 of drive boss 3 in the drive opening 12 of blade 30.

As may be appreciated with reference to FIGS. 4a and 4b, thickness T of drive head 11 is preferably equal to or slightly less than thickness 38 of the mounting plate 32 of cup saw blade 30, such that the blade 30 will be firmly clamped between the locking plate 8 and the drive boss 3 when the locking nut 4 is tightened against the drive boss 3. In alternative embodiments, drive head thickness T may be greater than thickness 38 of blade 30, but in such embodiments it may be necessary or desirable to interpose spacers or shims (not shown) between the locking plate 8 and mounting plate 32 of blade 30—or, alternatively, between the mounting plate 32 and shoulder 13 of drive boss 3—to ensure secure clamping of the blade 30.

It will be readily appreciated that it is not essential for the locking plate 8 and drive head 11 to be of square configuration as shown in FIG. 3. Either or both of these components could be of some other non-circular shape (such as an equilateral or irregular polygonal shape, or an oblong curvilinear shape) so long as:

(a) the drive head 11 matingly engages a correspondingly shaped drive opening 12 in the blade or other attachment being mounted; and (b) there is a portion of the locking plate 8 that extends radially outward from the drive opening 12 when the locking plate 8 is rotationally offset relative to the drive opening 12; such that at least a portion of blade 30 will be sandwiched and clamped between locking plate 8 and the drive boss 3 when the locking nut 4 is tightened onto the threaded shaft 6 of mandrel 2.

Figure 6:
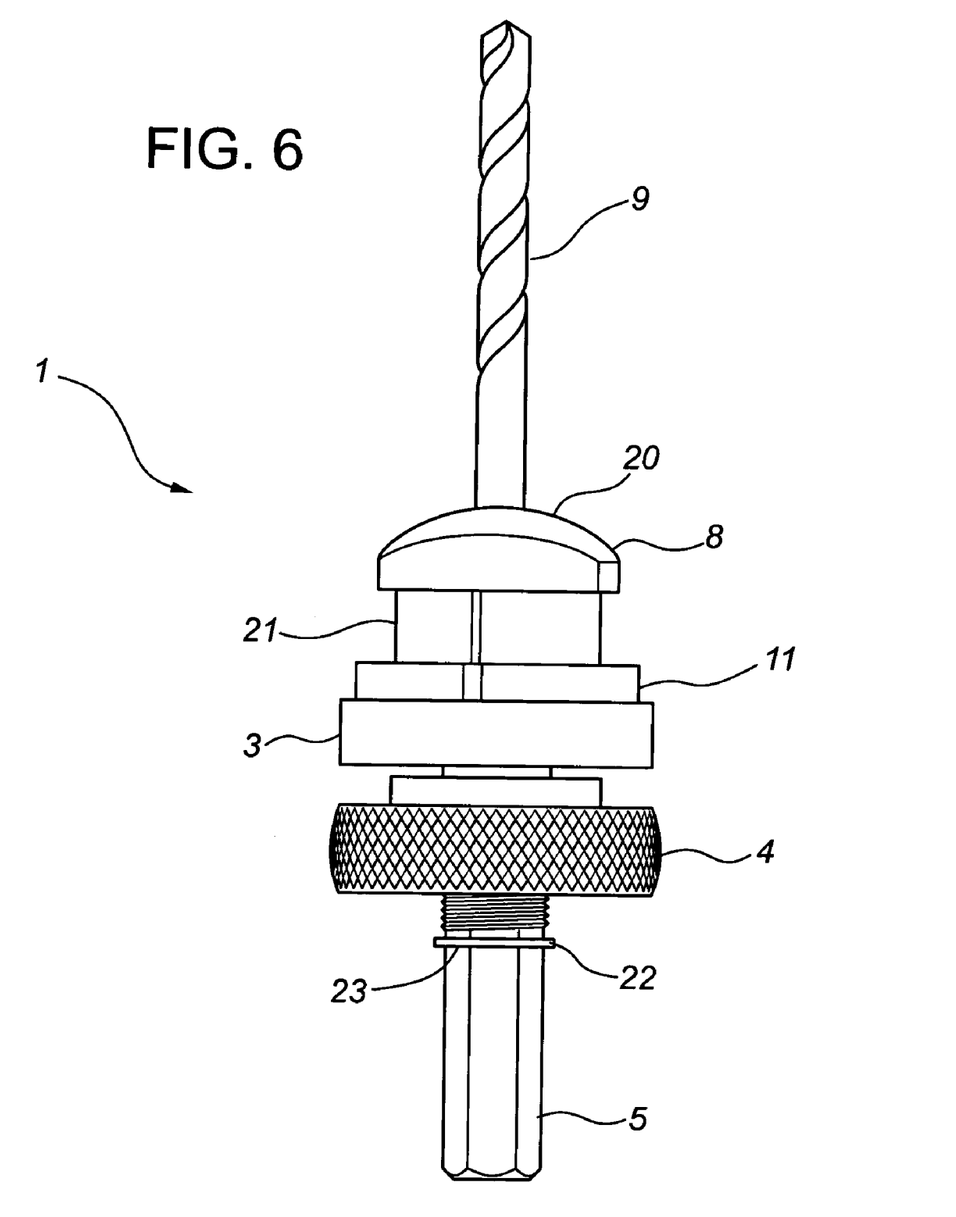
FIG. 6 illustrates an alternative embodiment of the invention in which the drive stage is square in cross section.
Figure 7:
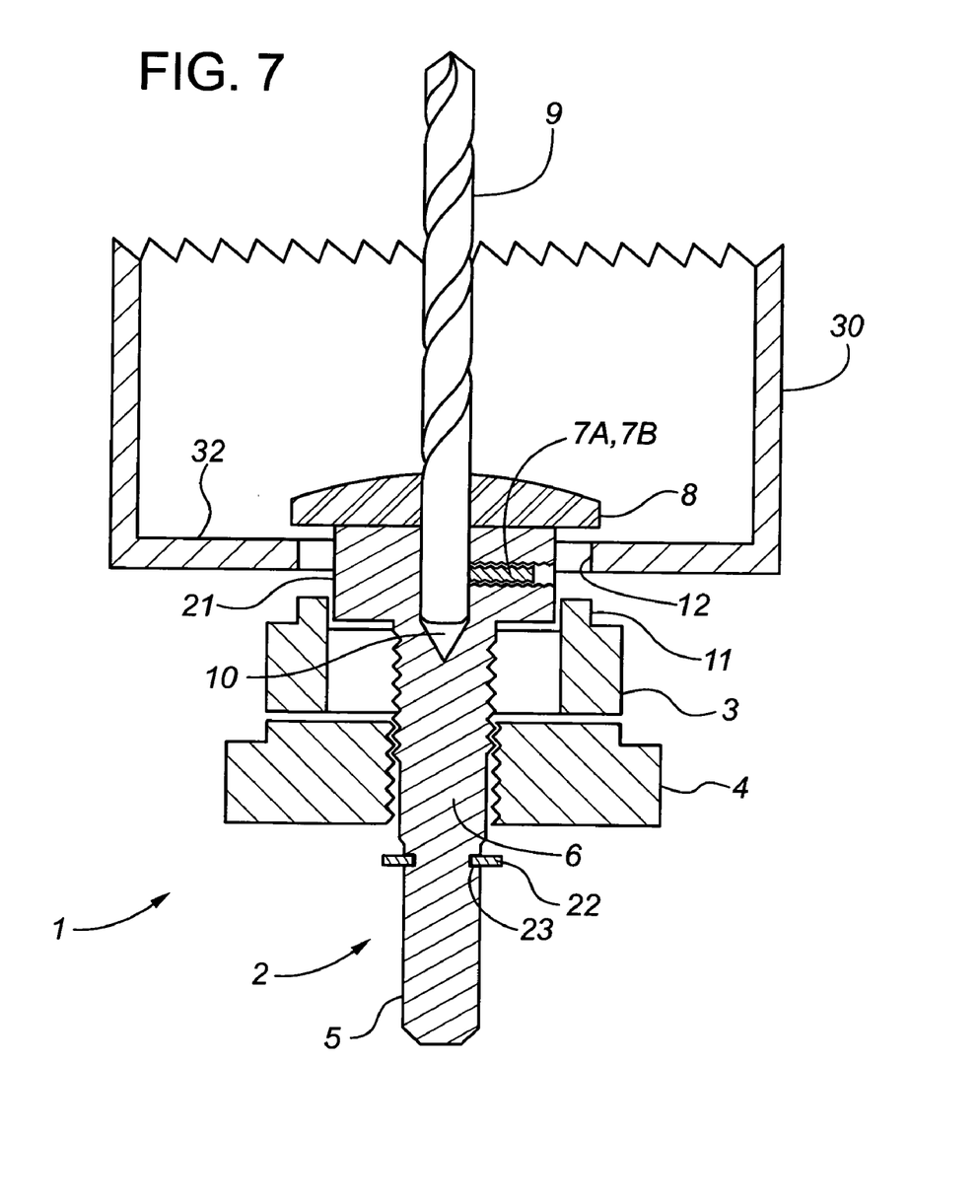
FIG. 7 is a sectional view of the arbor apparatus of FIG. 6, shown with a cup saw blade mounted.

In the alternative embodiment shown in FIGS. 6 and 7, the locking plate 8 is profiled for ease of insertion into the opening 12 in blade 30. Preferably, the locking plate 8 is rounded on a leading surface 20 so as to substantially remove any angular edges and to facilitate insertion into the blade opening 12. In this alternative embodiment, the hexagonal drive stage 7 of the previous embodiment is replaced with a square drive stage 21, and central passage 3C of drive boss 3 also square so as to receive the square drive stage 21 in order to engage and drive the drive boss 3. The square drive stage 21 is substantially the same size as the square drive head 11 and the opening 12 so as to remove excess play between mandrel 2 and blade 30 and thereby to facilitate engagement and removal of the square drive head 11 from blade 30.

Figure 8:
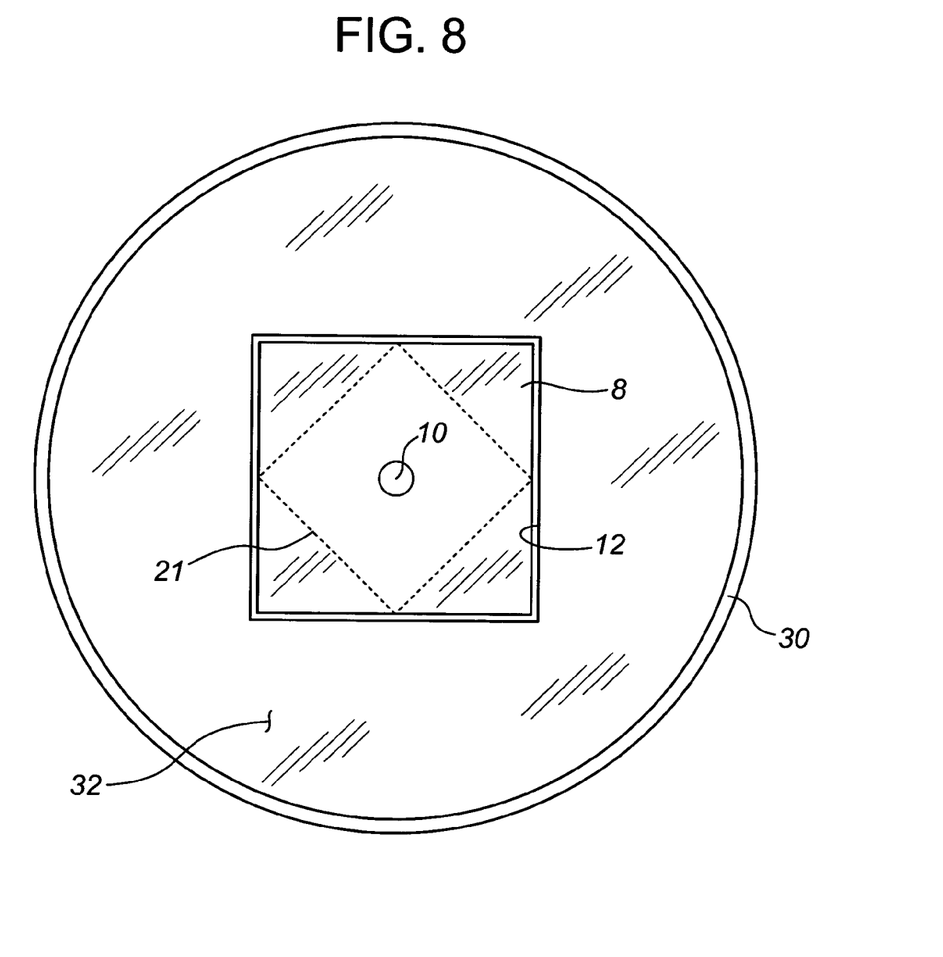
FIG. 8 is an end view of the locking plate of the embodiment of FIG. 6.

As best seen in FIG. 8, the square drive stage 21 preferably extends radially substantially to the edges of locking plate 8, so that when the locking nut 4 is backed off from the blade 30 and the mandrel 2 is to be removed, the locking plate 8 is substantially centered in the opening 12 and is easily removed when the locking plate 8 is rotated to match the orientation of the opening 12.

In preferred embodiments of the arbor apparatus, a snap ring or retainer clip 22 is fit within a groove 23 formed on the chuck stage 5 to prevent complete removal of the locking nut 4 from the mandrel 2. The groove 23 is positioned on the chuck stage 5 so as to provide adequate range of axial movement of the locking nut 4 for loosening and tightening of the arbor apparatus 1 on blade 30 or other attachment.

Figure 9:
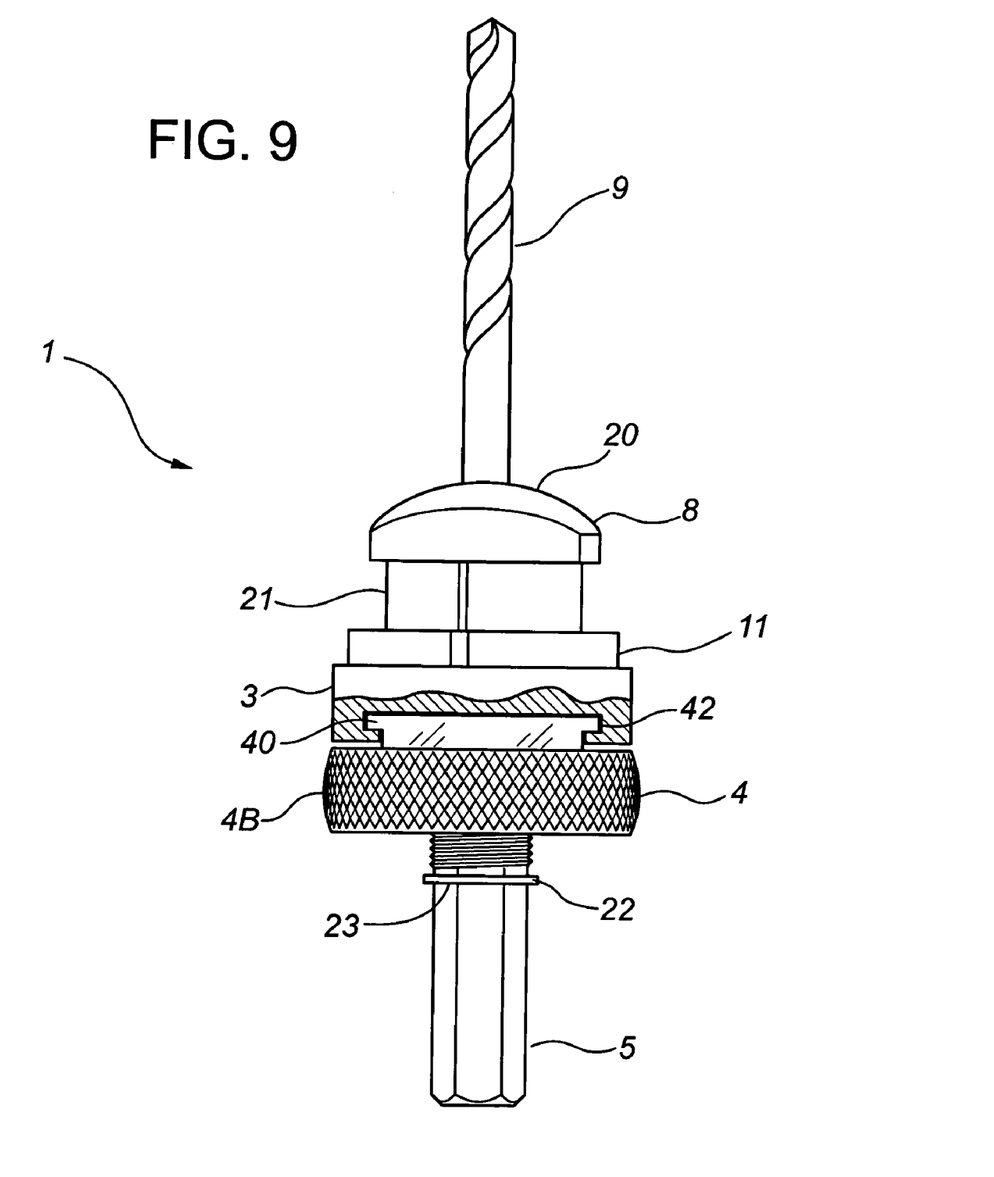
FIG. 9 is a sectional view of the embodiment shown in FIG. 6, wherein the locking nut is flanged for co-operation with a grooved drive boss so as to cause the drive boss and locking nut to move together axially when the locking nut is rotated on the threaded shaft of the apparatus.

In yet another embodiment of the invention, as shown in FIG. 9, the locking nut 4 is formed with a circular flange 40 which cooperates with an annular groove 42 formed in the lower portion of the drive boss. In this embodiment, the drive boss 3 moves axially with the lock nut 4 as it is rotated, thus speeding up the process of locking and unlocking the blade 30 to the arbor apparatus 1.

It will be readily seen by those skilled in the art that various modifications of the present invention may be devised without departing from the essential concept of the invention, and all such modifications are intended to be included in the scope of the claims appended hereto.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. An arbor apparatus for mounting an attachment for a rotary drive tool, said attachment having a drive opening, and said arbor apparatus comprising:
    (a) a mandrel comprising, in coaxial arrangement:
        a.1 a chuck stage, adapted for removable engagement with a chuck of a rotary drive tool;
        a.2 a threaded shaft stage adjoining the chuck stage, with the radius of the threaded shaft stage at the thread root being not less than the largest radial cross-sectional dimension of the chuck stage;
        a.3 a drive stage adjoining the threaded shaft stage and having a non-circular cross-section, with the smallest radial cross-sectional dimension of said drive stage being not less than the outer radius of the threaded shaft stage; and
        a.4 a non-circular locking plate adjoining the drive stage, and having an upper surface and a substantially planar lower surface, said lower surface being oriented toward the drive stage and being substantially perpendicular to the longitudinal axis of the mandrel;
    (b) a drive boss comprising:
        b.1 a main body section having an upper end and a lower end;
        b.2 a prismatic drive head projecting above the upper end of the main body section and having an upper surface, said drive head being of a cross-sectional shape adapted for mating engagement with the drive opening of the attachment;

wherein:
        b.3 the drive boss has a central passage extending therethrough from the upper surface of the drive head to the lower end of the main body section;
        b.4 the central passage is geometrically configured to receive the drive stage of the mandrel in mating engagement therewith, such that rotation of the mandrel will induce rotation of the drive boss;
        b.5 the orientation of the central passage relative to the drive head is such that upon insertion of the drive stage into the passage, a portion of the locking plate will project over the upper surface of the drive head; and
        b.6 the upper end of the main body section of the drive boss defines a shoulder surface extending radially beyond the perimeter of the drive head, said shoulder surface being substantially planar and being substantially perpendicular to the longitudinal axis of the drive boss; and
    (c) a locking nut having a threaded bore engageable with the threaded shaft stage.

2. The arbor apparatus of claim 1 wherein the drive stage of the mandrel is hexagonal in cross section.

3. The arbor apparatus of claim 1 wherein the drive stage of the mandrel is substantially square in cross section.

4. The arbor apparatus of claim 1 wherein the locking plate is polygonal.

5. The arbor apparatus of claim 4 wherein the locking plate is substantially square.

6. The arbor apparatus of claim 1 wherein the mandrel incorporates means for coaxially and removably mounting a pilot bit extending from the upper surface of the locking plate.

7. The arbor apparatus of claim 6 wherein the mandrel has an axial bore extending from the upper surface of the locking plate into the drive stage, for receiving a pilot bit, and the means for mounting the pilot bit comprises a set screw engageable with a threaded bore extending radially inward from a side surface of the drive stage and intercepting the axial bore.

8. The arbor apparatus of claim 1 wherein the drive head is substantially square in cross section, for mating engagement with a square drive opening in a rotary tool attachment.

9. The arbor apparatus of claim 1 wherein at least a portion of the perimeter surface of the locking nut is textured.

10. The arbor apparatus of claim 1 wherein the locking nut has a circular flange retainingly and rotatably engageable within an annular groove formed in the lower end of the drive boss.

11. The arbor apparatus of claim 1 wherein the chuck stage has a perimeter groove for receiving means for retaining the locking nut.

12. The arbor apparatus of claim 11 wherein the means for retaining the locking nut comprises a retainer clip.

13. The arbor apparatus of claim 11 wherein the means for retaining the locking nut comprises a snap ring.

14. The arbor apparatus of claim 1 wherein the upper surface of the locking plate is contoured.

15. The arbor apparatus of claim 1 wherein the locking plate is square and the drive stage is square in transverse cross section, said square drive stage being angularly offset approximately 45 degrees from the locking plate, and said square drive stage being sized such that each of its four corner edges coincides substantially with the midpoint of a corresponding side edge of the locking plate.

* * * * *